(12) United States Patent
Dreux

(10) Patent No.: US 6,985,402 B2
(45) Date of Patent: Jan. 10, 2006

(54) PROGRAMMABLE ADDRESS GENERATOR

(75) Inventor: Philippe Dreux, Seynod (FR)

(73) Assignee: STMicroelectronics S.A., Montrouge (FR)

( * ) Notice: Subject to any disclaimer, the term of this patent is extended or adjusted under 35 U.S.C. 154(b) by 123 days.

(21) Appl. No.: 10/738,750

(22) Filed: Dec. 17, 2003

(65) Prior Publication Data

US 2004/0174766 A1 Sep. 9, 2004

(30) Foreign Application Priority Data

Dec. 17, 2002 (FR) ................... 02 16011

(51) Int. Cl.
*G11C 8/00* (2006.01)
(52) U.S. Cl. ............... 365/236; 365/233; 711/220
(58) Field of Classification Search ............... 365/236, 365/230.01, 233; 711/220
See application file for complete search history.

(56) References Cited

U.S. PATENT DOCUMENTS

| | | | |
|---|---|---|---|
| 4,777,485 A | 10/1988 | Costello | |
| 5,155,823 A * | 10/1992 | Tsue ........................ | 711/217 |
| 5,572,705 A | 11/1996 | Carson | |
| 5,610,873 A * | 3/1997 | Lee ........................ | 365/230.01 |
| 6,351,833 B1 * | 2/2002 | Nomura ........................ | 714/718 |
| 6,363,026 B1 * | 3/2002 | Su et al. ................. | 365/230.01 |
| 6,708,264 B1 * | 3/2004 | Abe et al. .................... | 711/169 |

FOREIGN PATENT DOCUMENTS

EP 0 473 392 3/1992

OTHER PUBLICATIONS

French Search Report for FR 0216011 dated Sep. 2, 2003.

* cited by examiner

*Primary Examiner*—Tan T. Nguyen
(74) *Attorney, Agent, or Firm*—Lisa K. Jorgenson; Bryan A. Santarelli; Graybeal Jackson Haley LLP

(57) ABSTRACT

A programmable address generator comprising at least one input for receiving a first digital address of a data word in a first memory, to be converted into a second digital address of this same data word in a second memory, or conversely, comprising: at least two hierarchically interleaved counters, that can be individually parameterized for their initial offset, their increment value, and their maximum count; at least one programming register containing said parameters of each counter, these parameters depending on the addressing conversion function to be performed; and an adder of the first address with the counter results, said adder providing said second address.

21 Claims, 2 Drawing Sheets

PROGRAMMABLE ADDRESS GENERATOR

PRIORITY CLAIM

This application claims priority from French patent application No. 02/16011, filed Dec. 17, 2002, which is incorporated herein by reference.

TECHNICAL FIELD

The present invention relates to the field of address generators or direct memory access controllers (DMA). Such address generators are used to simplify accesses to a data storage memory by automatic processes processing these data in a specific order. These processes are generally designated as functions for processing the memorized data. The DMA controller or address generator is used to accelerate the processing by calculating the addresses of the data to be extracted from the memory based on the requests of the function for processing these data.

DISCUSSION OF THE RELATED ART

An example of application of the present invention relates to the processing of video images. In this type of application, a same memory containing digital data representative of video images may be exploited by several different functions processing the data in different orders. For example, in image processing techniques of MPEG 2 type, the video images are divided into pixel macroblocks. According to the way in which the images are stored in an external memory, it may be necessary to restore the image lines for a line scanning video display, or to restore macroblocks for estimations of the displacement of image portions in the video flow, etc.

Since the same external memory can be shared by several different functions, each function, that is, each circuit for processing the images in a specific manner, is coupled to a DMA controller which is specific to it to calculate the addresses of the data to be read from or written into the external memory, based on the function needs.

FIG. 1 schematically shows in the form of blocks an example of a conventional architecture using an address generator of the type to which the present invention relates.

A memory 1 (MEM), for example, a SDRAM-type video memory, contains data (DATA) to be exploited by a specific function (block 2, SPE-FCT) for processing these data. Processing circuit 2 generally communicates with a microprocessor μP 3 via one or several buses 4 and an interconnection 5 to which is connected microprocessor 3 by means of one or several buses 6.

For their processing by circuit 2, the data are transferred from memory 1 into a buffer 7 (BUFF), for example, a RAM-type memory forming a buffer or FIFO, between circuit 2 and external memory 1. Data DATA transit between temporary memory 7 and memory 1 via a bus 8 and an interconnection 9 to which is connected memory 1 by a bus 10, and between memory 7 and the actual processing function 2 via a bus 11. To accelerate the processing, memory 7 must exhibit the data in the order of their processing by circuit 2.

Temporary memory 7 generally belongs to what is called an interface circuit 12 between function 2 and memory 1. Circuit 12 belongs to a circuit 13 (FCT) representing the global function and comprising processing function 2 and its circuit 12 of interface towards the outside. Circuit 12 generally comprises a bus controller (BUS CTRL) 14 as well as an address generator 20 (AD-GEN) to which the present invention applies. Circuit 20 aims at generating addresses ADD for memory 1 so that it provides proper data, based on so-called base addresses provided by function 2 according to its needs over an address bus 15 connecting circuit 2 to interface 12. Addresses ADD transit between generator 20 and memory 1 via an address bus 16 and interconnection 9, to which is connected memory 1 via an address bus 17.

Bus controller 14 is used to control and synchronize exchanges. It provides, among others, control signals (connection 18) to temporary memory 7 and receives information from address generator 20 (connection 19). Microprocessor 3 communicates with interface circuit 12 by means of bus 4. Although the buses have been shown separately in FIG. 1 for clarity, some of them at least may be shared.

The fact that the rules or addressing functions between a processing circuit 2 and a memory 1 containing the data to be processed differ according to the function implemented by the processing circuit results in making the used address generators versatile.

Programmable DMA controllers which can implement different addressing functions according to the processing circuit and to the memory with which it is associated have already been provided.

Such DMA controllers use either simple counters, or tables for storing the correspondences between the addresses of memory 1 and the processing addresses specific to circuit 2, that is, the addresses of memory 7.

Conventional counter controllers have a very limited programming capacity and thus require most of the time designing a new hardware interface circuit for a new processing function.

DMA controllers with tables have a programming capacity linked to the size of the provided correspondence tables. Indeed, the more significantly the table is sized, the more the DMA controller may be programmed for a significant number of different addressing functions. However, an often prohibitory disadvantage is that the significance of the integrated storage memory of the correspondence tables considerably increases the controller cost and bulk.

In the two known solutions, a lack of programming capacity translates as a prejudicial increase in the logic and/or in the storage within the very processing function 2.

SUMMARY

An embodiment of the present invention aims at providing a novel programmable address generator which overcomes the disadvantages of known address generators. More specifically, an embodiment of the present invention aims at providing a programmable address generator which avoids use of tables of correspondence of memorized addresses.

An embodiment of the present invention also aims at providing a solution which provides a flexibility of use of the material.

An embodiment of the present invention also aims at providing a solution which is of low bulk and low cost.

An embodiment of the present invention also aims at providing a solution that can adapt to a high number of different addressing functions.

To achieve these and other objects, an embodiment of the present invention provides a programmable address generator comprising at least one input for receiving a first digital address of a data word in a first memory, to be converted into a second digital address of this same data word in a second memory, or conversely, comprising:

at least two hierarchically interleaved counters, that can be individually parameterized for their initial offset, their increment value, and their maximum count;

at least one programming register containing said parameters of each counter, these parameters depending on the addressing conversion function to be performed; and an adder of the first address with the counter results, said adder providing said second address.

According to an embodiment of the present invention, the number of programmable counters ranges between 3 and 5.

According to an embodiment of the present invention, the address generator is applied to video image processing.

According to an embodiment of the present invention, the counters are of fractal type.

According to an embodiment of the present invention, the generator further comprises a circuit for controlling the different counters and registers.

The foregoing objects, features, and advantages of the present invention will be discussed in detail in the following non-limiting description of specific embodiments in connection with the accompanying drawings.

DETAILED DESCRIPTION

Figure 1:
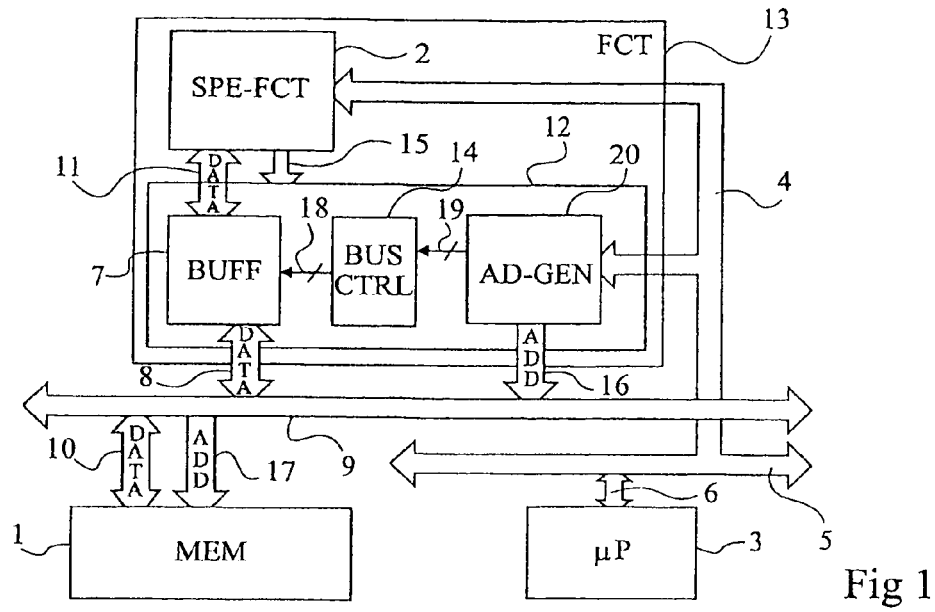
FIG. 1, previously described, schematically and partially shows an example of a circuit of the type to which the present invention applies.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

For clarity, only those elements and those functions that are necessary to the understanding of the present invention have been shown in the drawings and will be described hereafter. In particular, the processings performed on the handled and transferred data due to the address generator of the present invention have not been detailed and are no object of the present invention. The present invention applies whatever the provided processing function. Further, only the operation of the address generator will be detailed, the other components of an interconnection circuit and of the elements that it interconnects (memory, processing circuit, microprocessor, etc.) being conventional.

A feature of an embodiment of the present invention is to translate an addressing function to be implemented as a finite number of addressing loops that can be individually parameterized. According to this embodiment of the present invention, each addressing function, that is, each function translating a digital word representing a data address in a memory coupled to a processing circuit by another digital word, is divided into a finite number of addressing loops, whatever the complexity of the function.

Thus, this embodiment of the present invention enables hierarchically interleaving several counters and making these counters likely to be each individually parameterized at least in increment value, in initial offset, and in maximum count (modulo). The results of the counters are added to provide the searched calculated address.

Figure 2:
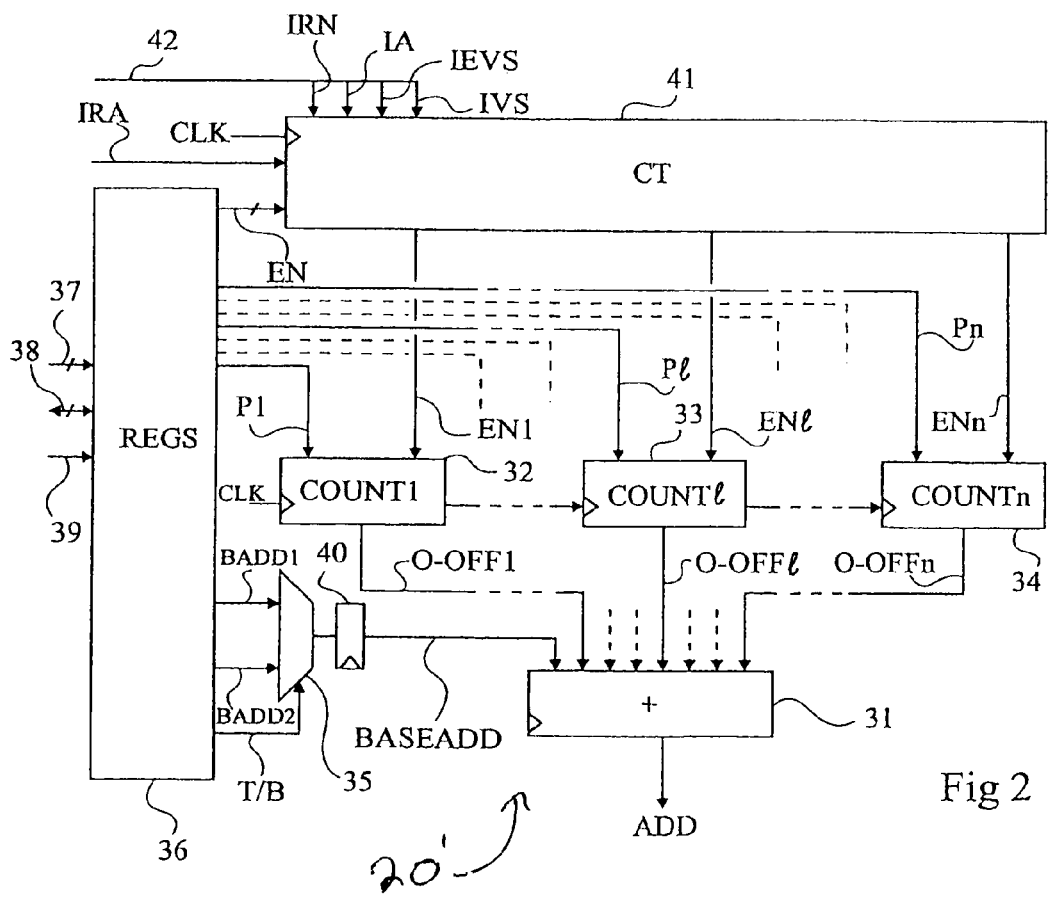
FIG. 2 shows in the form of blocks an embodiment of a programmable address generator according to the present invention.

FIG. 2 schematically shows in the form of blocks an embodiment of an address generation circuit according to the present invention. In FIG. 2, only address generation circuit 20' has been shown. It integrates in an interface circuit 12 of the type described in relation with FIG. 1. FIG. 2 is described hereafter by also referring to elements of FIG. 1, which are then designated with same reference numerals.

Address ADD generated by the circuit of this embodiment of the present invention corresponds to the arithmetic sum (adder 31) of a base address BASEADD with the different results O-OFF1, ... O-OFFi, ... O-OFFn provided by n counters COUNT1, ... COUNTi, ... COUNTn (blocks 32, 33, and 34). Base address BASEADD corresponds to the address on the side of the processing circuit performing the applicative function, that is, the address in memory 7 which is converted into an address of memory 1.

In the example of FIG. 2, to accelerate the processings and enable preload of at least one next address upon processing of the current address, a multiplexer 35 for providing base address BASEADD by selection of an address among, for example, at least two addresses BADD1 and BADD2 provided by processing circuit 2 or microprocessor 3 controlling it is optionally provided. Multiplexer 35 then receives a control signal T/B for selecting one of its inputs to provide an address BASEADD, and a buffer register 40 is interposed between the output of multiplexer 35 and adder 31. This illustrates the fact that this embodiment of the present invention is compatible with a series calculation of several addresses by exploiting the fact that the address calculation is sequential and exploits several distinct successive circuits (internal portions of the counters and of the adder).

Addresses BADD1 and BADD2 originate from a set of registers 36 (REGS) containing the different registers of temporary storage of the parameters of the address generator of this embodiment of the present invention. Register circuit 36 communicates with the outside of generator 20' (for example, with memory 1, circuit 2, microprocessor 3, bus controller 14, etc.) via a set of address 37, data 38, and control 39 buses.

According to this embodiment of the present invention, each counter COUNTi (I ranging between 1 and n) is associated with at least one register (for example, from register set 36) containing its parameters, among which at least the modulo (MOD) or maximum count of the counter, the increment value (INC) of the counter at each pulse of its clock, the initial offset (OFF) of the counter on each reset. In fact, the inputs of the interleaved counters are respectively connected to an output indicating the end of a loop of the counter of higher rank, the clock input of the counter of highest rank (1) being, for example, connected to the clock signal CLK of the system. It should be noted that, according to the structure of the different counters, what has been indicated hereabove as a clock input may correspond to an increment triggering input, if other components internal to the counters need the system clock.

Each counter receives a set of parameters P1, ... Pi, ... Pn provided by registers 36 and comprising at least above-mentioned parameters MOD, INC, and OFF.

The provision of results O-OFFI of the different counters to adder 31 is triggered by a logic control circuit 41 (CT) providing results T1, . . . Ti, . . . Tn for triggering the provision of the results of the respective counters. Control circuit 41 triggers this result provision, and thus the provision of the calculated address, from different synchronization signals that it receives both from registers 36, from processing circuit 2, and from microprocessor 3. For example, circuit 41 receives, in addition to clock signal CLK of the system, signals EN of registers 36 validating the fact that a count has occurred, IRA of bus controller 14 or of microprocessor 3 requiring a read address, and 42 of synchronization with respect to processing circuit 2. The number of synchronization signals 42 depends on the function. For example, a first signal designated as IVS resets address generator 20' (for example, on a falling edge). A second signal IEVS (for example, active in the high state) forbids a reset while the address generator transfers an address ADD on its output. A signal IA activates the address generator. Finally a signal IRN is used to set circuit 41.

The signals described hereabove in relation with FIG. 2 may be generated by microprocessor 3 or any application circuit conditioning the address generator operation and are sufficient to provide all possible cases for the provision.

Functionally and taking as an example the case of three counters noted i, j and k, the address generator of FIG. 2 and more specifically the interleaved counters perform, once properly parameterized, the following function in which the successive states provided by the three counters corresponding to their respective current offsets are designated as O-OFFi, O-OFFj, and O-OFFk, their respective increments are designated as INCi, INCj, and INCk, their respective initial offsets are designated as OFFi, OFFj, and OFFk, their maximum respective counts (modulo) are designated as MODi, MODj, and MODk, and their respective maximum numbers of iterations calculated from the corresponding modulos are designated as Ni, Nj, and Nk.

With these notations, the three interleaved counters may be considered as executing the following successive operations:
1. O-OFFk=OFFk
2. for k ranging between 0 and Nk (Nk such that O-OFFk<MODk):
3. O-OFFj=OFFj
4. for j ranging between 0 and Nj (Nj such that O-OFFj<MODj):
5. O-OFFi=OFFi
6. for i ranging between 0 and Ni (Ni such that O-OFFi<MODi):
7. O-OFFi=(O-OFFi+INCi) modulo MODi
8. i=i+1
9. back to 6
10. O-OFFj=(O-OFFj+INCj) modulo MODj
11. j=j+1
12. back to 4
13. O-OFFk=(O-OFFk+INCk) modulo MODk
14. k=k+1
15. back to 2
16. back to 1

At any time, the provided address corresponds to value ADD= BASEADD+O-OFFi+O-OFFj+O-OFFk.

The counters are counters of fractal type, that is, which have the same properties whatever the maximum count.

A specific example applied to image processing will be described hereafter. It should however be noted that the present invention more generally applies whatever the memorized data. The only limit to the versatility is linked to the number of circuit counters. This number is preferentially comprised between 3 and 5. It should be noted that it is of little importance for the generator to comprise more interleaved counters than necessary for a given addressing function. Indeed, it is then enough to provide null loops (MOD=0) for non useful counters, which is perfectly possible due to the parameterizing of these counters through registers 36 and/or control logic 41. It should further be noted that the references to memories 1 and 7 suppose an arbitrary direction of the addressing function which can of course be inverted according to whether memory 1 is read from or written into.

Figures 3A, 3B, 3C:
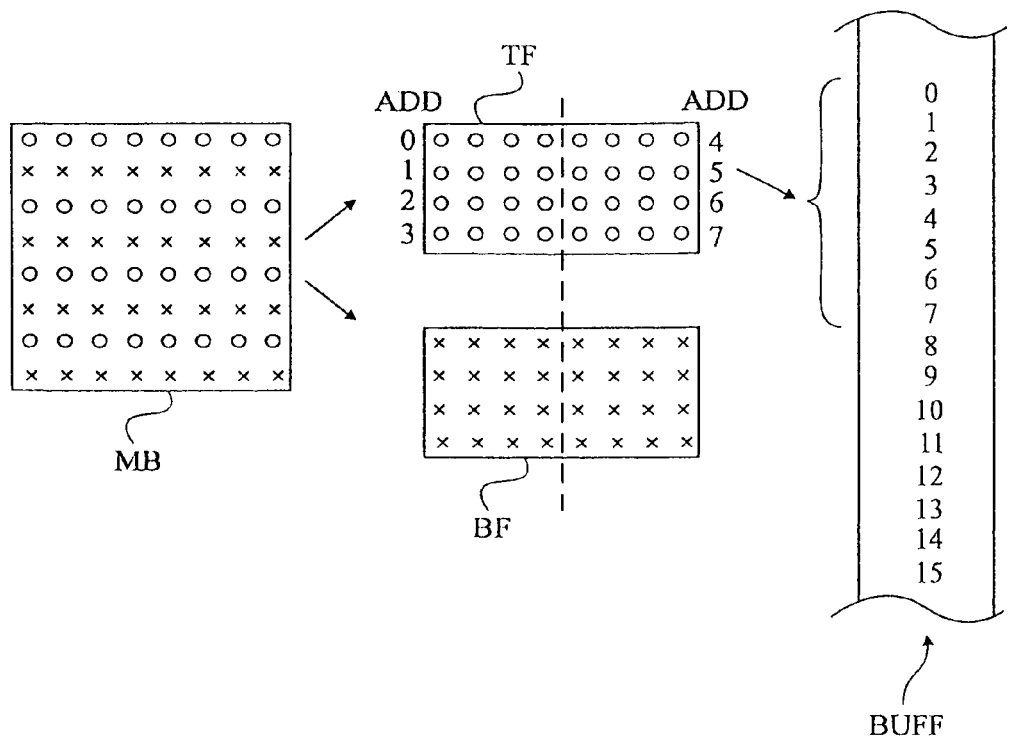
FIGS. 3A to 3D illustrate representations of memorization areas in an example of application of according to n embodiment of the present invention to a circuit of interconnection of a video processing function of MPEG 2 type with an image storage memory.

FIGS. 3A to 3D illustrate an embodiment of the generator of the present invention for image processing. In this arbitrary example, the case where macroblocks MB (FIG. 3A) comprise interlaced data of different types designated as x and o (for example, lines of even order and lines of odd order) has been considered. Image MB of FIG. 3A shows the pixels as they will be displayed on the visualization system, respecting the arbitrary orientation (left, right, top, and bottom) of the drawing. It is assumed that the image data are stored in memory 1 in two areas TF (top field) and BF (bottom field) of different addresses (FIG. 3B), each of them only storing the pixels designated as o or x, respectively. The pixels are thus not stored in memory 7 in their display order, but following a rule which is illustrated in FIG. 3C. In FIG. 3B, reference references ADD illustrate the correspondence with the physical storing address in memory 7. For example, each memory box of external memory 1 stores four pixels over 2 bits representing, for the needs of the application, the associated luminance in binary code. It is further assumed that the left-hand and right-hand portions of each line of macroblock MB are separated in two so that the first line of top field TF comprises the words stored at addresses 0 and 4 of memory 7, the second line comprising the words stored at addresses 1 and 5, etc. Bottom field BF, corresponding to pixels x, has a structure which is identical to the structure of field TF and is stored in another part of memory 1.

Figure 3D:
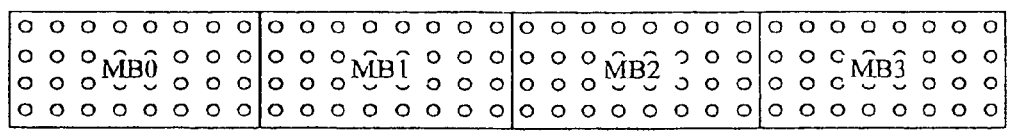

In FIG. 3D, successive macroblocks MB0, MB1, MB2, and MB3 form a first line of macroblocks of type o in memory 1. For simplification, this example is limited to the restoring of the image formed by four macroblocks only for o-type pixels.

In this example of application, the addressing function is obtained, with a generator with 3 counters designated i, j and k, by programming the first loop with an increment INCk at 1 and with a modulo (MODk) at 3. The second loop is programmed with a count increment INCj equal to the number of macroblocks in the horizontal direction and a modulo (MODj) of 23. The third loop is programmed with an increment INCi of 4 and modulo (MODi) of 8. The initial offset OFF of the three loops is 0.

Tables 1 and 2 illustrate the above example to display in natural fashion the o-type pixels of macroblocks MB0 to MB3, the content of which is illustrated hereafter by table 1. Arbitrarily, pixels respectively at 0, 1, 2, and 3 have been considered for lines 0, 1, 2, and 3. Table 2 illustrates the pixel storage respectively in external memory 1 and in temporary memory 7.

TABLE 1

| | | | |
|---|---|---|---|
| 0000 | 0000 | 0000 | 0000 |
| 1111 | 1111 | 1111 | 1111 |
| 2222 | 2222 | 2222 | 2222 |
| 3333 | 3333 | 3333 | 3333 |

TABLE 2

| ADD | 1 | 7 |
|-----|------|------|
| 00H | 0000 | 0000 |
| 01H | 1111 | 0000 |
| 02H | 2222 | 0000 |
| 03H | 3333 | 0000 |
| 04H | 0000 | 0000 |
| 05H | 1111 | 0000 |
| 06H | 2222 | 0000 |
| 07H | 3333 | 0000 |
| 08H | 0000 | 1111 |
| 09H | 1111 | 1111 |
| 0AH | 2222 | 1111 |
| 0BH | 3333 | 1111 |
| 0CH | 0000 | 1111 |
| 0DH | 1111 | 1111 |
| 0EH | 2222 | 1111 |
| 0FH | 3333 | 1111 |
| 10H | 0000 | 2222 |
| 11H | 1111 | 2222 |
| 12H | 2222 | 2222 |
| 13H | 3333 | 2222 |
| 14H | 0000 | 2222 |
| 15H | 1111 | 2222 |
| 16H | 2222 | 2222 |
| 17H | 3333 | 2222 |
| 18H | 0000 | 3333 |
| 19H | 1111 | 3333 |
| 1AH | 2222 | 3333 |
| 1BH | 3333 | 3333 |
| 1CH | 0000 | 3333 |
| 1DH | 1111 | 3333 |
| 1EH | 2222 | 3333 |
| 1FH | 3333 | 3333 |

An advantage of this embodiment of the present invention is that it enables forming a programmable address generator which is much less bulky than a conventional table generator.

Another advantage of this embodiment of the present invention is that with a limited number of comparators, the address generator can be extremely versatile. According to a preferred embodiment, the number of counters is limited to five.

Thus, when an address generator must be designed for a new processing circuit of a function (for example, in image processing), the addressing loop parameters are determined. Then, it is enough to configure the programmable counters for the address generator to be ready to operate. In practice, these configurations are performed in a circuit design step. Then, the counter parameters are fixed in their respective registers by the integrated circuit.

For example, the same structure of an address generator with three interleaved counters such as described hereabove may be parameterized for other MPEG2 processing functions. By using two counters (MODk=0), and by selecting INCj=1452, OFFj=0, MODj=743424, and INCi=2, OFFi=2, MODi=1452, a buffer memory 4 containing luminance values Y in the display order (from left to right and from line to line) is obtained, from images of 512 lines of 726 pixels stored in memory 1 in the form illustrated by table 3, in which Y(a, b) designates the luminance of the pixel of line a and column b and C(a, b) designates its blue and red chrominances (a ranges between 1 and 512 and b ranges between 1 and 726).

TABLE 3

| ADD | DATA |
|-----|------|
| 0000H | C(1, 1) |
| 0001H | Y(1,) |
| 0002H | C(1, 2) |
| 0003H | Y(1, 2) |
| 0004H | C(1, 3) |
| 0005H | Y(1, 3) |
| ... | ... |
| 05AAH | C(1, 726) |
| 05ABH | Y(1, 726) |
| 05ACH | C(2, 1) |
| 05ADH | Y(2, 1) |
| ... | ... |

Table 4 hereafter illustrates the different values taken by variables O-OFFk, O-OFFj, O-OFFi to provide addresses ADD of the luminance information (DATA) alone in the display order, from base addresses BASEADD.

TABLE 4

| BASEADD | O-OFFk | O-OFFj | O-OFFi | ADD | DATA |
|---------|--------|--------|--------|------|------|
| 0000H | 0 | 0 | 1 | 0001H | Y(1, 1) |
| 0000H | 0 | 0 | 3 | 0003H | Y(1, 2) |
| 0000H | 0 | 0 | 5 | 0005H | Y(1, 3) |
| ... | ... | ... | ... | ... | ... |
| 0000H | 0 | 0 | 0 | 05ABH | Y(1, 726) |
| 0000H | 0 | 5AC | 1 | 05ADH | Y(2, 1) |
| ... | ... | ... | ... | ... | ... |

Of course, the present invention is likely to have various alterations, modifications, and improvement which will readily occur to those skilled in the art. In particular, the determination of the different programming parameters of the generator is within the abilities of those skilled in the art based on the functional indications given hereabove and on the application. On this regard, the present invention is particularly advantageous for data stored with a repetitive organization (images, database, etc.). Further, the determination of the size (number of bits of the counters) is also within the abilities of those skilled in the art. In a specific example of implementation, 32-bit counters will be used.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A programmable address generator comprising at least one input for receiving a first digital address of a data word in a first memory, to be converted into a second digital address of this same data word in a second memory, or conversely, comprising:
   at least two hierarchically interleaved counters, that can be individually parameterized for their initial offset, their increment value, and their maximum count;
   at least one programming register containing said parameters of each counter, these parameters depending on the addressing conversion function to be performed; and
   an adder of the first address with the counter results, said adder providing said second address.

2. The address generator of claim 1, wherein the number of programmable counters ranges between 3 and 5.

3. The address generator of claim 1, applied to video image processing.

4. The address generator of claim 1, wherein the counters are of fractal type.

5. The address generator of claim 1, further comprising a circuit for controlling the different counters and registers.

6. An address generator, comprising:
a first counter operable to receive a first clock, to generate a first count in response to the first clock, and to generate a second clock in response to the first count;
a second counter coupled to the first counter and operable to generate a second count in response to the second clock; and
an adder coupled to the first and second counters and operable to generate an address by combining the first and second counts.

7. The address generator of claim 6 wherein the first and second counts include respective first and second count offsets.

8. The address generator of claim 6 wherein:
the first counter is operable to alter the first count value by a first predetermined amount during each of a plurality of periods of the first clock; and
the second counter is operable to alter the second count by a second predetermined amount during each of a plurality of periods of the second clock.

9. The address generator of claim 6 wherein the first clock has a higher frequency than the second clock.

10. The address generator of claim 6 wherein the adder is further operable to receive a base address and to generate the address by combining the base address and the first and second counts.

11. The address generator of claim 6, further comprising:
wherein the second counter is operable to generate a third clock in response to the second count; and
a third counter coupled to the second counter and to the adder and operable to generate a third count in response to the third clock; and
wherein the adder is operable to generate the address by combining the first, second, and third counts.

12. The address generator of claim 6 wherein the first counter is operable to generate the second clock when the first count has a predetermined value.

13. The address generator of claim 6 wherein the adder is operable to generate the address by summing the first and second counts.

14. A computer system, comprising:
an address bus; and
an address generator coupled to the address bus and comprising,
a first counter operable to receive a first clock, to generate a first count in response to the first clock, and to generate a second clock in response to the first count,
a second counter coupled to the first counter and operable to generate a second count in response to the second clock, and
an adder coupled to the first and second counters and operable to generate an address by combining the first and second counts.

15. A method, comprising:
generating a first count in response to a first clock;
generating a second clock in response to the first count;
generating a second count in response to the second clock; and
generating an address by combining the first and second counts.

16. The method of claim 15 wherein generating the second clock comprises generating the second clock when the first count has a predetermined value.

17. The method of claim 15 wherein:
generating the first count comprises generating the first count starting from a first count offset; and
generating the second count comprises generating the second count starting from a second count offset.

18. The method of claim 15 wherein:
generating the first count comprises periodically altering the first count by a first predetermined amount; and
generating the second count comprises periodically altering the second count by a second predetermined amount.

19. The method of claim 15 wherein generating the address comprises combining a base address and the first and second counts.

20. The method of claim 15, further comprising:
generating a third clock in response to the second count;
generating a third count in response to the third clock; and
wherein generating the address comprises combining the first, second, and third counts.

21. The method of claim 15 wherein generating the address comprises summing the first and second counts.

* * * * *